US012559414B2

(12) United States Patent
Tanno et al.

(10) Patent No.: US 12,559,414 B2
(45) Date of Patent: Feb. 24, 2026

(54) GLASS HAVING COLORED LAYER AND METHOD FOR MANUFACTURING SAME

(71) Applicant: HOYA CORPORATION, Tokyo (JP)

(72) Inventors: Yoshitake Tanno, Tokyo (JP); Naomi Matsumoto, Tokyo (JP)

(73) Assignee: HOYA CORPORATION, Tokyo (JP)

(*) Notice: Subject to any disclaimer, the term of this patent is extended or adjusted under 35 U.S.C. 154(b) by 221 days.

(21) Appl. No.: 18/020,535

(22) PCT Filed: Apr. 8, 2021

(86) PCT No.: PCT/JP2021/014873

§ 371 (c)(1),
(2) Date: Feb. 9, 2023

(87) PCT Pub. No.: WO2022/044416

PCT Pub. Date: Mar. 3, 2022

(65) Prior Publication Data

US 2023/0265006 A1 Aug. 24, 2023

(30) Foreign Application Priority Data

Aug. 31, 2020 (JP) ................................ 2020-145896

(51) Int. Cl.

*B32B 15/04* (2006.01)
*B32B 17/06* (2006.01)
*C03C 3/21* (2006.01)
*C03C 4/02* (2006.01)
*C03C 17/00* (2006.01)

(Continued)

(52) U.S. Cl.

CPC .................. *C03C 4/02* (2013.01); *C03C 3/21* (2013.01); *C03C 17/002* (2013.01); *C03C 17/004* (2013.01); *C03C 17/09* (2013.01); *G02B 1/12* (2013.01); *C03C 2217/254* (2013.01); *C03C 2217/261* (2013.01); *C03C 2218/154* (2013.01); *C03C 2218/32* (2013.01);

(Continued)

(58) Field of Classification Search

CPC ........................................................ C03C 4/02
USPC ......................................... 428/426, 410, 210
See application file for complete search history.

(56) References Cited

U.S. PATENT DOCUMENTS 6,674,236 B1 1/2004 Awaji et al.
7,192,897 B2 * 3/2007 Yamane .................... C03C 3/16 501/48

(Continued)

FOREIGN PATENT DOCUMENTS

JP 11-228176 A 8/1999
JP 11-228184 A 8/1999

(Continued)

OTHER PUBLICATIONS

Office Action issued in TW Patent Application No. 110113359, Aug. 1, 2024, translation.

(Continued)

*Primary Examiner* — Lauren R Colgan
(74) *Attorney, Agent, or Firm* — GREENBLUM & BERNSTEIN, P.L.C.

(57) ABSTRACT

To provide glass including a colored layer and a manufacturing method thereof.

Provided is glass containing one or more glass components selected from the group consisting of Ti ions, Nb ions, W ions, and Bi ions. The glass includes a colored layer having an arbitrary shape.

8 Claims, 5 Drawing Sheets

FIRST MAIN SURFACE

SECOND MAIN SURFACE

(51) Int. Cl.
*C03C 17/09* (2006.01)
*G02B 1/12* (2006.01)

(52) U.S. Cl.
CPC .... *C03C 2218/328* (2013.01); *C03C 2218/36* (2013.01); *C03C 2218/365* (2013.01)

(56) References Cited

U.S. PATENT DOCUMENTS

| | | | | |
|---|---|---|---|---|
| 9,834,465 | B2 * | 12/2017 | Mikami | C03B 5/167 |
| 10,556,827 | B2 * | 2/2020 | Hoppe | C03C 4/0071 |
| 12,187,640 | B2 * | 1/2025 | Ikenishi | G02B 1/00 |
| 12,330,984 | B2 * | 6/2025 | Sato | C03C 23/007 |
| 2002/0073735 | A1 * | 6/2002 | Hayashi | C03C 3/16<br>65/32.1 |
| 2015/0111717 | A1 | 4/2015 | Gabel et al. | |
| 2020/0183051 | A1 | 6/2020 | Taguchi | |
| 2020/0227087 | A1 * | 7/2020 | Eda | G11B 17/021 |
| 2021/0048665 | A1 * | 2/2021 | Nakamura | G02B 5/003 |
| 2021/0333449 | A1 * | 10/2021 | Nakamura | G02B 5/1814 |
| 2022/0250968 | A1 * | 8/2022 | Sato | C03C 3/21 |
| 2023/0202917 | A1 * | 6/2023 | Tanno | C03C 3/14<br>428/410 |
| 2023/0250016 | A1 * | 8/2023 | Ikenishi | G02B 1/00<br>428/210 |

FOREIGN PATENT DOCUMENTS

| | | | |
|---|---|---|---|
| JP | 2000-331616 | A | 11/2000 |
| JP | 2002-201041 | A | 7/2002 |
| JP | 2015-179788 | A | 10/2015 |
| JP | 2015-528782 | A | 10/2015 |
| JP | 5792026 | B2 | 10/2015 |
| TW | 201539053 | A | 10/2015 |
| WO | 2019/065143 | A1 | 4/2019 |
| WO | 2019/151404 | A1 | 8/2019 |
| WO | WO2020230649 | * | 11/2020 |

OTHER PUBLICATIONS

Office Action issued in CN Patent Application No. 202180057223.X, Aug. 1, 2024, translation.

Tawarayama et al., "Coloration and Decoloration of Tungsten Phosphate Glassed by Heat Treatment at the Temperature Far Below Tg Under a Controlled Ambient", American Chemical Society, May 12, 2006, pp. 2810-2816.

ISR issued in WIPO Patent Application No. PCT/JP2021/014873, Jun. 29, 2021, translation.

IPRP issued in WIPO Patent Application No. PCT/JP2021/014873, Feb. 28, 2023, translation.

Office Action issued in JP Patent Application No. 2020-145896, Jul. 9, 2024, translation.

Office Action issued in TW Patent Application No. 110113359, Apr. 9, 2025, translation (translation erroneously indicates year "2024").

Office Action issued in CN Patent Application No. 202180057223.X, Mar. 18, 2025, translation.

Office Action issued in TW Patent Application No. 110113359, Nov. 17, 2025, translation.

* cited by examiner

[FIG. 1]
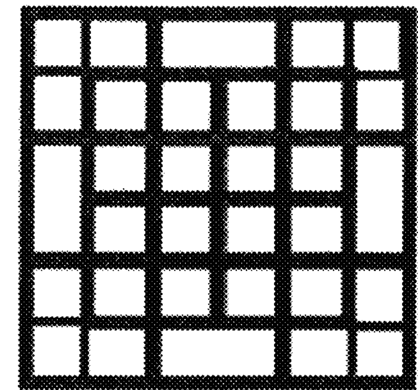
[FIG. 2]
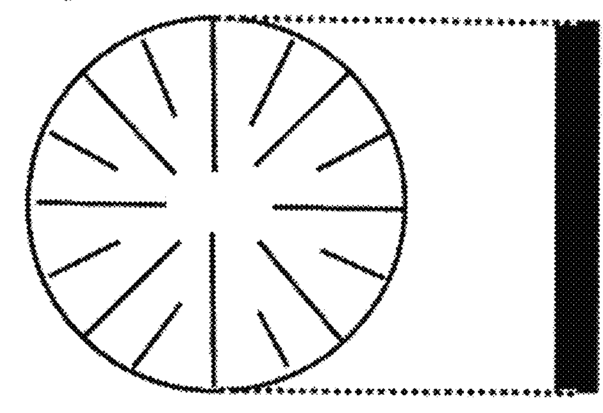
[FIG. 3]
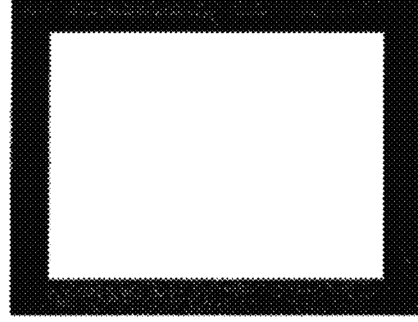
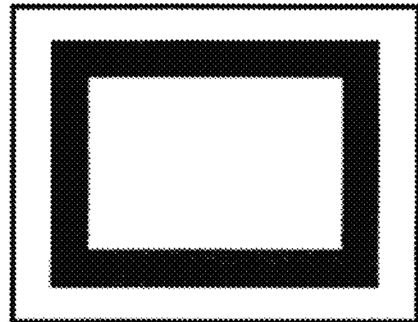

[FIG. 4]
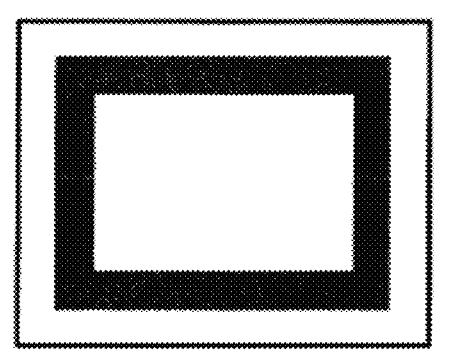
FIRST MAIN SURFACE
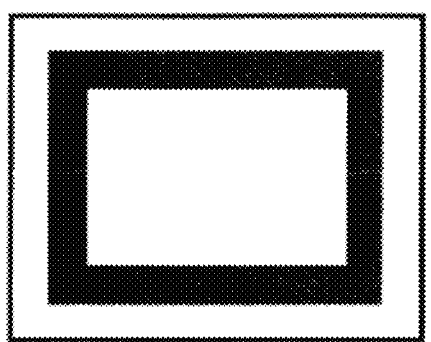
SECOND MAIN SURFACE
[FIG. 5]
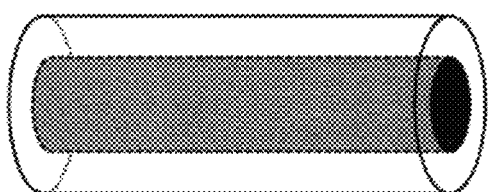
[FIG. 6]
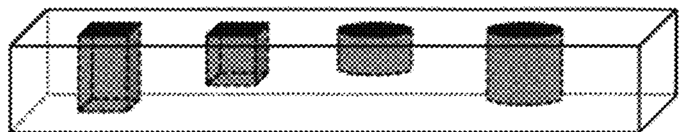

[FIG. 7]
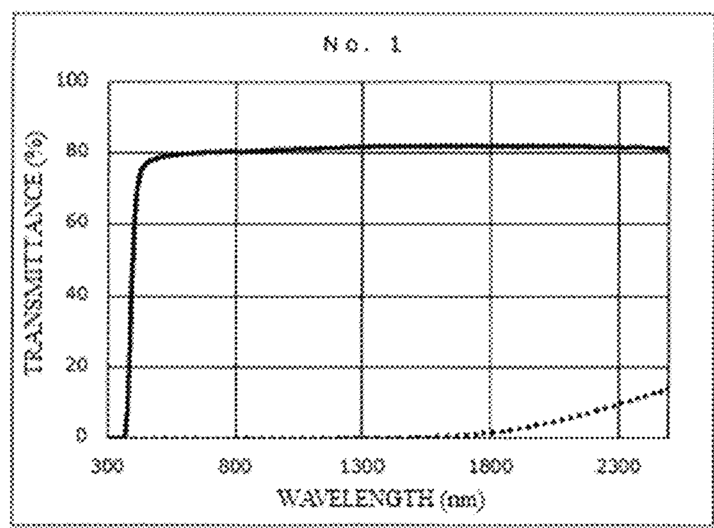
[FIG. 8]
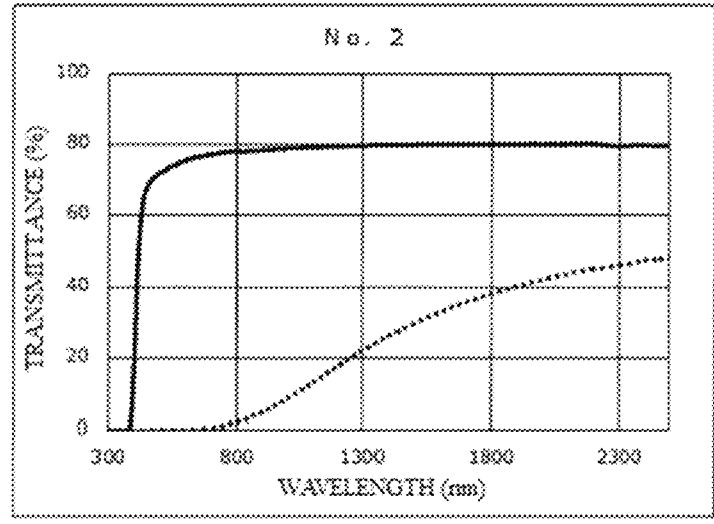

[FIG. 9]
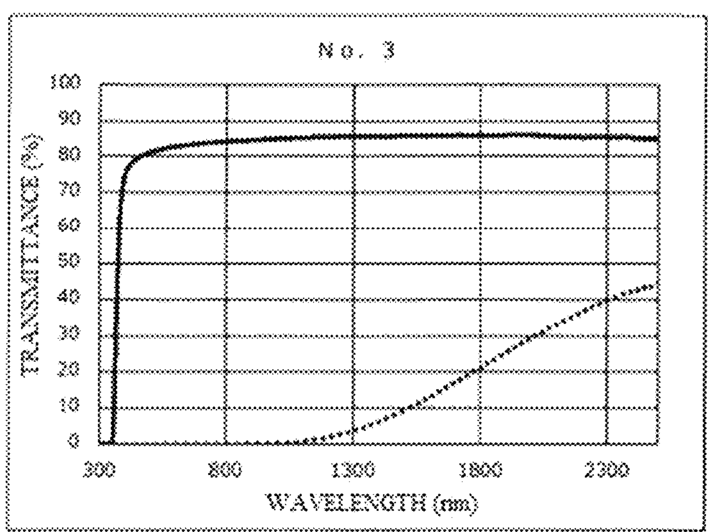
[FIG. 10]
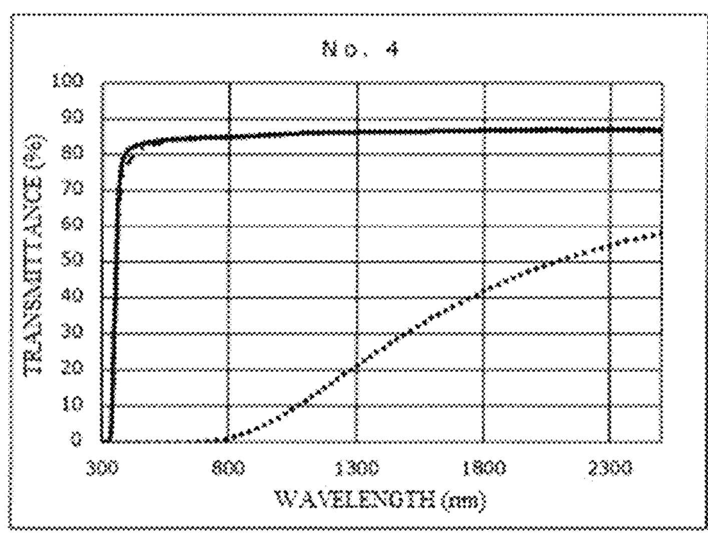

[FIG. 11]
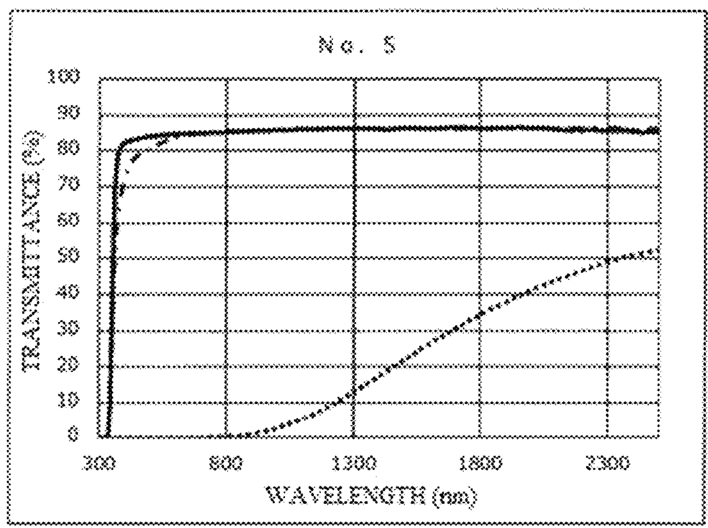
[FIG. 12]
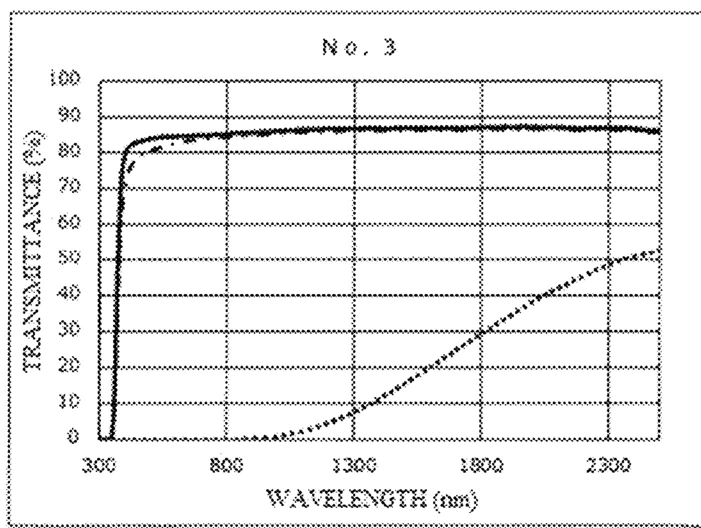

GLASS HAVING COLORED LAYER AND METHOD FOR MANUFACTURING SAME

TECHNICAL FIELD

The present invention relates to glass including a colored layer.

BACKGROUND ART

Patent Document 1 discloses an invention in which a transmittance of glass is caused to vary by subjecting the glass to a heat treatment in an oxidizing atmosphere or a non-oxidizing atmosphere. However, Patent Document 1 does not disclose a configuration in which a colored layer is formed in glass.

Patent Document 2 discloses a transparent substrate including a light-transmitting portion through which light is transmitted, and a light-shielding portion that is formed to surround the outer periphery of the light-transmitting portion and shields a part of light. For example, the transparent substrate is suitable for a cover glass that is attached to a front surface of a package that accommodates a solid-state imaging element, and protects the solid-state imaging element and is used as a transparent window, or the like. The light-shielding portion has a function of suppressing flare or ghost that is caused by stray light.

There is disclosed an example in which a film of a metal material such as chromium (Cr), tantalum (Ta), molybdenum (Mo), nickel (Ni), titanium (Ti), copper (Cu), and aluminum (Al), or a film of a resin material in which a black pigment such as carbon is dispersed, a resin material in which a plurality of colors of colored layers having a light-transmitting property are stacked, or the like is formed on a surface of a transparent substrate to provide a light-shielding portion, but a configuration in which a light-shielding property is applied by coloring the glass itself is not disclosed.

Patent Document 1: JP 2002-201041 A

Patent Document 2: JP 2015-179788 A

SUMMARY

An object of the present invention is to provide glass including a colored layer and a manufacturing method thereof.

The gist of the present invention is as follows.

(1) Glass containing:

one or more glass components selected from the group consisting of Ti ions, Nb ions, W ions, and Bi ions, wherein the glass includes a colored layer having an arbitrary shape.

(2) The glass according to (1), wherein the glass has a plate shape, and the colored layer is provided in a single surface or both surfaces.

(3) The glass according to (1)

wherein the glass has a plate shape, the colored layer is provided on a first main surface and a second main surface, and the colored layer of the first main surface does not overlap the colored layer of the second main surface in a plan view.

(4) The glass according to (1), wherein the glass has a plate shape, the colored layer is provided on a first main surface and a second main surface, and a part or the entirety of the colored layer of the first main surface overlaps a part or the entirety of the colored layer of the second main surface in a plan view.

(5) An optical element comprising the glass according to any one of (1) to (4).

(6) A cover glass comprising the glass according to any one of (1) to (4), the cover glass including:

a light-shielding portion and a light-transmitting portion, wherein the light-shielding portion and the light-transmitting portion have the same glass composition, and the light-shielding portion comprises the colored layer.

(7) A method for manufacturing glass that contains one or more glass components selected from the group consisting of Ti ions, Nb ions, W ions, and Bi ions and includes a colored layer having an arbitrary shape, the method including:

a process of forming a metal film having an arbitrary shape on a glass surface; and a process of performing a heat treatment in a reducing atmosphere.

According to the present invention, it is possible to provide glass including a colored layer and a manufacturing method thereof.

BRIEF DESCRIPTION OF DRAWINGS

FIG. 1 is a schematic view illustrating an example of an embodiment of the present invention;

FIG. 2 is a schematic view illustrating an example of the embodiment of the present invention;

FIG. 3 is a schematic view illustrating an example of the embodiment of the present invention;

FIG. 4 is a schematic view illustrating an example of the embodiment of the present invention;

FIG. 5 is a schematic view illustrating an example of the embodiment of the present invention;

FIG. 6 is a schematic view illustrating an example of the embodiment of the present invention;

FIG. 7 is a graph illustrating a transmittance of a portion including a colored layer in a glass sample in Example 1-1;

FIG. 8 is a graph illustrating a transmittance of a portion including a colored layer in a glass sample in Example 1-2;

FIG. 9 is a graph illustrating a transmittance of a portion including a colored layer in a glass sample in Example 1-3;

FIG. 10 is a graph illustrating a transmittance of a portion including a colored layer in a glass sample in Example 1-4;

FIG. 11 is a graph illustrating a transmittance of a portion including a colored layer in a glass sample in Example 1-5; and FIG. 12 is a graph illustrating a transmittance of a portion including a colored layer in a glass sample in Example 1-6.

In an embodiment, description will be given of glass according to the present invention on the basis of content ratios of respective components in notation of cation %. Accordingly, hereinafter, with regard to respective contents, "%" represents "cation %" unless otherwise stated.

The notation of cation % represents a mole percentage when the total content of all cation components is set to 100%. In addition, the total content represents the total content of a plurality of kinds of cation components (also including a case where the content is 0%). In addition, a cation ratio represents a proportion (ratio) of the content between cation components (also including the total content of a plurality of kinds of cation components) in cation %.

The content of a glass component can be measured by a known method, for example, inductively coupled plasma atomic emission spectroscopy (ICP-AES), inductively coupled plasma mass spectrometry (ICP-MS), or the like. In addition, in this specification and the present invention, when the content of a constituent component is 0%, this represents that the constituent component is substantially not contained, and the component is allowed to be contained in an unavoidable impurity level.

In addition, in this specification, a refractive index represents a refractive index nd in a d-line (wavelength: 587.56 nm) of yellow helium unless otherwise stated.

Hereinafter, an embodiment of the present invention will be described in detail.

Glass according to this embodiment includes a colored layer having an arbitrary shape. The colored layer is a colored portion of the glass itself, and preferably exists in a layer shape from a glass surface toward the inside.

The colored layer is a portion where a transmittance of light incident on the glass is small. Accordingly, in the glass according to this embodiment, in the light incident on the glass, a part or the entirety of the light incident on the colored layer is absorbed, and the intensity of transmitted light further attenuates in comparison to light that is not incident to the colored layer. That is, the glass according to this embodiment can have a portion with a small transmittance and a portion with a large transmittance.

In the glass according to this embodiment, the colored layer can be removed through grinding or polishing. In the glass according to this embodiment, the transmittance of the glass after removing the colored layer becomes larger than the transmittance before removing the colored layer.

The glass according to this embodiment includes the colored layer having an arbitrary shape. That is, the glass according to this embodiment may include the colored layer on the entirety of one or more surfaces of the glass, or the colored layer that is patterned into an arbitrary shape. In the case of patterning, for example, shapes such as patterns, characters, numbers, drawings, designs, and identification codes may be employed, or shapes drawn by a straight line or a curved line may also be employed. As in FIG. 1, the colored layer in which patterns or designs are freely patterned can be formed. FIG. 1 is a plan view of the glass according to this embodiment, and a dark portion is the colored layer and the other portions are non-colored portion. In the glass according to this embodiment, contrast between the colored layer and the non-colored portions which are not colored is clear, and thus the colored layer patterned into an arbitrary shape can be formed.

The glass according to this embodiment may be glass including the colored layer having an arbitrary shape on a side surface and/or a main surface. That is, the glass according to this embodiment may include the colored layer on the entirety of the side surface, and may include the colored layer that is patterned into an arbitrary shape on the side surface. Similarly, the glass according to this embodiment may include the colored layer on the entirety of the main surface, and may include the colored layer that is patterned into an arbitrary shape on the main surface. And, the glass according to this embodiment may include the colored layer having an arbitrary shape on the side surface and the main surface. For example, as illustrated in FIG. 2, the colored layer can be formed on the entirety of the side surface of the glass, and the colored layer patterned into an arbitrary shape may be formed on the main surface. The glass can be used as filter glass.

The glass according to this embodiment may be plate-shaped glass, and may include the colored layer having an arbitrary shape on a single surface or both surfaces. The colored layer may be provided on the entirety of the single surface or both surfaces, and may include the colored layer that is patterned into an arbitrary shape. The thickness of the glass is not particularly limited. However, in the case of forming the colored layer on both surfaces of the glass, if the thickness of the glass is small, the colored layer formed on one surface and the colored layer formed on the other surface may overlap in a thickness direction. In this case, the colored layer may be formed to pass through the glass in the thickness direction thereof.

In addition, in glass having a small thickness, a deformation such as warpage may occur in the glass due to formation of the colored layer. The reason for this is not particularly limited, but it is considered that an arbitrary stress occurs within the glass due to formation of the colored layer. In a case where warpage occurs because the colored layer is provided only on the single surface of the glass, the colored layer can be provided on both surfaces of the glass so as to cancel a stress that occurs within the glass. A shape of the colored layer is not particularly limited. Warpage or deformation caused by the colored layer is likely to occur in a case where the thickness of the glass is 1 mm or less.

The glass according to this embodiment may be plate-shaped glass in which the colored layer is provided on the first main surface and the second main surface, and the colored layer of the first main surface does not overlap the colored layer of the second main surface in a plan view. When providing the colored layer in this manner, the warpage or deformation of the glass which is caused by formation of the colored layer can be reduced. For example, as in FIG. 3, when the colored layer is provided on the first main surface and the second main surface of the glass at positions different from each other, the warpage or deformation of the glass can be reduced.

In addition, the glass according to this embodiment may be plate-shaped glass in which the colored layer is provided on the first main surface and the second main surface, and a part or the entirety of the colored layer of the first main surface overlaps a part or the entirety of the colored layer of the second main surface in a plan view. Even in this glass, the warpage or deformation of the glass can be reduced. For example, as in FIG. 4, in the plate-shaped glass, colored layers having the same shape may be formed on the first main surface and the second main surface of the glass at the same position in a plan view. In this case, the respective colored layers formed on the first main surface and the second main surface appear to be darkly colored even when the degree of coloration is small, since the colored layer of the first main surface and the colored layer of the second main surface appear to overlap each other in a plan view. In a case where the degree of coloration is small, the degree of warpage or deformation also decreases. And, in a case where degree of coloration may be small, heat treatment time in a reducing atmosphere to be described later can be shortened. When the heat treatment time in the reducing atmosphere is shortened, a transmittance in a non-colored portion other than the colored layer can be maintained to be high. As a result, a contrast between the colored layer and the non-colored portion in a plan view can be clearer.

The glass according to this embodiment may be plate-shaped glass in which the central portion in a plan view is a non-colored portion, and the colored layer is provided to surround the non-colored portion. The glass can be used as an optical element having a function of a cover glass.

A cover glass is an optical element that is disposed on a front of a solid-state imaging element as disclosed in Patent Document 2, and particularly, the cover glass is attached to a front surface of a package that accommodates the solid-state imaging element and protects the solid-state imaging element and is used as a light-transmitting window. In recent, an imaging module in which a solid-state imaging element such as CCD and CMOS is embedded is used in a portable telephone, an information portable terminal device, or the like. The imaging module includes a square package that accommodates a solid-state imaging element and is formed from ceramic or a resin, and a cover glass that is fixed to a peripheral edge portion of the package with an ultraviolet curable adhesive and seals the solid-state imaging element. However, when disposing an optical component such as the cover glass on a front surface of the solid-state imaging element (that is, in an optical path of light propagating to the solid-state imaging element), there is a problem that light reflected from a side surface or the like of the cover glass is incident on an imaging plane of the solid-state imaging element, and thus flare, ghost, or the like occurs.

Accordingly, in the related art, there is suggested a configuration in which a light-shielding plate is provided between a cover glass and a solid-state imaging element to shield an optical path of light that becomes the cause for ghost or the like. For example, in Patent Document (JP 2006-141726 A), a light-shielding plate and a cover glass are integrally formed by depositing a black metal such as chromium (Cr) on the cover glass. As the method of depositing Cr on a cover glass, a so-called photolithography method is used.

However, in the case of forming the light-shielding plate by etching as described above, it is necessary for the entirety of the glass to be immersed in an etching solution for relatively long time. Therefore, there is a problem that not only Cr but also a glass surface is etched by the etching solution, and thus the glass surface is roughened. And, when the glass surface is roughened, light propagating toward a solid-state imaging element is disturbed on the glass surface, and thus there is a problem that a transmittance decreases, flare occurs, and resolution decreases.

In addition, in the related art, a method in which a black ink is applied to a cover glass surface to provide a light-shielding property is also used. However, in this method, there is a problem that at a boundary between a portion where the black ink is applied and a portion where the black ink is not applied, light is reflected from a surface of the black ink, and stray light occurs. In addition, degassing occurs in the ink when a temperature rises, and thus the degassing becomes the cause for hazing of the cover glass surface.

In the glass according to this embodiment, the colored layer may have a light-shielding function. Accordingly, in the case of using the glass according to this embodiment as a cover glass, occurrence of flare or ghost caused by light reflected from a side surface or the like of the cover glass can be suppressed due to the colored layer. In addition, since the colored layer is formed by a heat treatment in a reducing atmosphere as described later, a problem that the glass surface is roughened does not occur. Moreover, since the colored layer has the same glass composition as in the non-colored portion, even when the temperature of the glass rises, degassing does not occur.

The glass according to this embodiment may be plate-shaped glass in which the central portion is a non-colored portion, and the colored layer is provided to surround the non-colored portion, and an edge portion of the glass is a non-colored portion in a plan view. The colored layer can be formed on a single surface or both surfaces. The glass can also be used as an optical element having a function of a cover glass. And, in the case of being used as a cover glass, occurrence of flare or ghost that caused by light reflected from a side surface or the like of the cover glass can be suppressed due to the colored layer. Specific examples include glass including the colored layer as illustrated in FIG. 4.

The non-colored portion allows light to be sufficiently transmitted therethrough in comparison to the colored layer. Accordingly, a photocurable resin such as an ultraviolet curable adhesive can be polymerized and cured by allowing light to be transmitted through the non-colored portion. That is, when a portion where the photocurable resin is used is set as the non-colored portion, adhesion with the photocurable resin can be performed. In a case where an edge portion of the glass is set as the non-colored portion, light can be transmitted through the edge portion. Accordingly, in the case of using the glass as a cover glass, the glass itself or another imaging element can be fixed with the photocurable resin or the like by allowing light to be transmitted through the edge portion.

As described above, in the case of using the glass according to this embodiment as a cover glass, the colored layer can function as a light-shielding portion and the non-colored portion can function as a light-transmitting portion (light-transmitting window). Here, in this embodiment, a glass surface that is in contact with a metal film is selectively colored by a heat treatment in a reducing atmosphere as described later, but a glass surface (non-colored portion) that is not in contact with the metal film may be slightly colored. However, non-preferable coloration in the non-colored portion can be reduced by shortening heat treatment time in the reducing atmosphere. For example, in plate-shaped glass as illustrated in FIG. 4, in a case where the colored layer is formed on the first main surface and the second main surface of the glass, an optical density (OD) of the colored layer of each of the first main surface and the second main surface is approximately halved by approximately halving the heat treatment time. However, since the colored layer is formed on the first main surface and the second main surface of the glass in the same shape at the same position in a plan view, the sum of the OD of the colored layer of the first main surface and the OD of the colored layer of the second main surface can be set as the OD of the light-shielding portion. In addition, in the non-colored portion, since the heat treatment time in the reducing atmosphere is approximately halved, coloration due to the heat treatment is halved and sufficiently reduced. As a result, the colored layer can secure a sufficient light-shielding property as a light-shielding portion and the non-colored portion can secure a sufficient light-transmitting property as a light-transmitting portion. Note that, in a range in which securement of a light-transmitting property in the non-colored portion and securement of a sufficient light-shielding property in the colored portion are compatible with each other, the colored layer of the first main surface and the colored layer of the second main surface may not have strictly the same shape, and the positions of the two colored layers in a plan view may not strictly the same as each other.

The glass according to this embodiment may be plate-shaped glass and may include the colored layer having an arbitrary shape on a side surface. The glass according to this embodiment may include the colored layer on the entirety of the side surface, or may include the colored layer that is patterned into an arbitrary shape on the side surface. The colored layer has a light-shielding function. Accordingly, in the case of using the glass according to this embodiment as a cover glass, since the colored layer having an arbitrary shape is provided on the side surface, stray light from a side surface of a lead frame or the like in the vicinity of a solid-state imaging element can be suppressed.

As described above, the glass according to this embodiment may be a plate-shaped glass and may include the colored layer on the first main surface and the second main surface. When using the glass as a cover glass, stray light from the front surface of the cover glass can be prevented. Moreover, the glass according to this embodiment may be plate-shaped glass, and may include the colored layer having an arbitrary shape on the first main surface, the second main surface, and the side surface. When using the glass as a cover glass, stray light that occurs on the front surface and the side surface can be suppressed.

In the glass according to this embodiment, in a case where the glass has a plate shape, the thickness of the glass is not particularly limited, but the thickness may be 1 mm or less, 0.7 mm or less, or 0.5 mm or less. When the glass according to this embodiment has a plate shape having the thickness within the above range and the colored layer is appropriately disposed as described above, the glass can be used as an optical element having a function of a cover glass.

The glass according to this embodiment may include a through-hole, and the colored layer having an arbitrary shape may be provided on an inner peripheral portion of the through-hole. For example, as illustrated in FIG. 5, the glass may be a tube-shaped glass, and the colored layer may be formed on an inner peripheral portion of the through-hole. A position or a length of the through-hole is not particularly limited. For example, in a plate-shaped glass, a through-hole may be provided at an arbitrary position, and the colored layer having an arbitrary shape may be formed on an inner peripheral portion of the through-hole. In addition, in a portion other than the inner peripheral portion of the through-hole, the colored layer may be formed or may not be formed.

The glass according to this embodiment may include a concave portion, and the colored layer having an arbitrary shape may be provided on an inner wall surface of the concave portion. For example, in one or more concave portion, the colored layer may be provided on the entirety of the inner wall surface of the concave portion, or the colored layer that is patterned into an arbitrary shape may be provided on the inner wall surface. A shape, a position, and a size of the concave portion are not particularly limited. For example, as illustrated in FIG. 6, the colored layer can be provided on an inner wall surface of a plurality of concave portions.

The glass according to this embodiment may include a convex portion, and the colored layer having an arbitrary shape may be provided in the convex portion. For example, in one or more convex portions, the colored layer may be provided on the entirety of a surface of the convex portion, or the colored layer that is patterned into an arbitrary shape may be provided on the convex portion. A shape, a position, and a size of the convex portion are not particularly limited.

The glass according to this embodiment can be used as an optical element. From the viewpoint of the use as the optical element, the glass according to this embodiment is preferably optical glass. However, the glass according to this embodiment can be used as decorations, exterior of small electronic devices, and the like by taking advantage of a decorative property of the colored layer, and thus the glass is not limited to the optical glass.

In the glass according to this embodiment, the colored layer and the non-colored portion have the same glass component composition. However, the colored layer and the non-colored portion may be different in the valence of glass components (cations).

Coloration of the colored layer is preferably a reduction color caused by a glass component, and more preferably a reduction color caused by a transition metal. Examples of the transition metal include Ti, Nb, W, and Bi. Accordingly, the glass according to this embodiment contains one or more glass components selected from the group consisting of Ti ions, Nb ions, W ions, and Bi ions, and preferably contains the Bi ions.

In the related art, in order to apply a light-shielding property to glass, a coloration component such as CuO, CoO $V_2O_5$, and the like is contained as a glass component in accordance with a wavelength region of light to be absorbed (for example, WO 2015/125565). Therefore, it is necessary to adjust a glass component to be contained in accordance with a wavelength region of light to be absorbed, and various coloration components are required to be contained when being used as, for example, a light-shielding portion of a cover glass. On the other hand, a light-transmitting portion of a cover glass is required to have a sufficient light-transmitting property in a wide wavelength region such as from a visible region to an infrared region. As a result, it is necessary to greatly change a composition between glass that is used as a light-shielding portion and glass that is used as a light-transmitting portion. Typically, chemical and physical properties of glass greatly depend on a glass composition. That is, when the glass composition is different, a difference occurs in properties such as an expansion coefficient and the like of the glass. Therefore, when joining a plurality of pieces of glass different in a composition by a method such as fusion, there is a problem that a strain or a deformation caused by a residual stress occurs, or the strength of the joined glass decreases. In addition, in a case where the glass is fused and integrated, the glass is required to be flow-deformed and joined, and thus a process of processing the glass to an appropriate shape is required. Moreover, since the glass is flow-deformed, it is difficult to control a shape of the glass to be joined with high accuracy.

In contrast, in this embodiment, since the colored layer can be formed at a part of the glass, the colored layer and the non-colored portion have the same glass composition, and thus the colored layer and the non-colored portion can be provided in one piece of glass without joint. In addition, in this embodiment, the colored layer has a sufficient light-shielding property, and the non-colored portion has a sufficient light-transmitting property. Moreover, in this embodiment, the colored layer having an arbitrary shape can be formed, and a contrast between the colored layer and the non-colored portion is clear, and thus a shape of the colored layer can be controlled with high accuracy. And, in the glass according to this embodiment, since the colored layer and the non-colored portion have approximately the same refractive index, in a case where the glass is used as a cover glass, interfacial reflection between the colored layer and the non-colored portion can be suppressed, and stray light can be effectively suppressed.

Accordingly, the glass according to this embodiment includes a light-shielding portion and a light-transmitting portion, and can be used as a cover glass in which the light-shielding portion and the light-transmitting portion have the same glass composition. At this time, the light-shielding portion includes the colored layer, and the light-transmitting portion includes the non-colored portion. The light-shielding portion can be set to have an arbitrary shape. Since the light-shielding portion and the light-transmitting portion have the same composition, the light-shielding portion and the light-transmitting portion can have approximately the same refractive index, and thus interfacial reflection between the light-shielding portion and the light-transmitting portion can be suppressed, and stray light can be effectively suppressed.

(Thickness of Colored Layer)

The thickness of the colored layer is not particularly limited, but the thickness is preferably 1 to 300 μm, more preferably 20 to 200 μm, and still more preferably 30 to 150 μm.

(OD)

In the glass according to this embodiment, a spectral transmittance of the colored layer in a wavelength region from a visible region (a wavelength region of 400 to 760 nm) to an infrared region tends to increase as the wavelength becomes longer. On the other hand, the OD of the colored layer tends to decrease as the wavelength is longer. The OD is an optical density or an optical concentration, and is expressed by a numerical value obtained by adding a negative sign (minus) to a common logarithm of a ratio of an incident light intensity $I_0$ and a transmitted light intensity I as expressed by the following Expression.

$$OD=-\log_{10}(I/I_0)$$

In a case where the glass according to this embodiment includes the colored layer and the non-colored portion in which a transmittance of a visible region is large, the OD of the colored layer is large, and the OD of the non-colored portion becomes small. In measurement of the OD, in a case where measurement light passes through both the colored layer and the non-colored portion, since the OD of the non-colored portion is sufficiently small, the OD of the colored layer becomes dominant.

In the glass according to this embodiment, the OD of a portion provided with the colored layer at a wavelength of 1100 nm is preferably 0.3 or more, and more preferably in the order of 0.4 or more, 0.5 or more, 0.7 or more, 1.0 or more, and 1.5 or more. On the other hand, the OD of the non-colored portion at a wavelength of 1100 nm is preferably 0.15 or less, and more preferably 0.1 or less.

Typically, a sensitivity region of an optical sensor such as a CCD and a CMOS sensor ranges from a visible region to the vicinity of 1100 nm. When the colored layer having the OD in the above range is provided, glass capable of shielding light over the entirety of the sensitivity region of the optical sensor is obtained. Accordingly, it is preferable that the glass according to this embodiment can control a transmittance with respect to light beams in a wavelength region ranging from a visible region to 1100 nm.

Note that, in glass having two surfaces facing each other, the OD in a case where colored layers having the same thickness and the same degree of coloration are provided on both surfaces of the glass becomes approximately two times a case where the same colored layer is provided on only one surface.

In addition, in the glass according to this embodiment, the OD decreases in combination with an increase of a wavelength in a wavelength region ranging from a visible region to a near-infrared region. Accordingly, in a portion provided with the colored layer, for example, the OD at a wavelength of 780 nm is larger than the OD at a wavelength of 1100 nm.

Accordingly, in a case where a wavelength region desired to be shielded is present, the OD is set to be high at a wavelength on a long wavelength side in the wavelength region. In the case of designing glass that shields only visible light, the OD may be set to be high on a long wavelength side (for example, 780 nm) of a visible light region. In addition, in the case of designing glass that shields from a visible region to a near-infrared region, the OD may be set to be high at a wavelength (for example, a wavelength of 1100 nm) of the near-infrared region. The OD can be controlled by adjusting the thickness or the degree of coloration of the colored layer.

Note that, in the glass according to this embodiment, the non-colored portion has a high transmittance preferably with respect to light beams in a wavelength region from a visible region to an infrared region, and more preferably with respect to light beams in a wavelength region from a visible region to 1100 nm. Particularly, the transmittance of the non-colored portion at a thickness of 1 mm is preferably 50% or more with respect to light beams having a wavelength of 400 to 800 nm, and more preferably in the order of 60% or more, 70% or more, 75% or more, 77% or more, and 80% or more. In addition, λ70 of the non-colored portion is preferably 550 nm or less, and more preferably in the order of 500 nm or less, 480 nm or less, 460 nm or less, and 450 nm or less. Note that, λ70 is a wavelength in which an external transmittance becomes 70% when a spectral transmittance is measured with respect to a glass sample having a thickness of 10.0 mm±0.1 mm.

(Refractive Index)

In the glass according to this embodiment, a refractive index nd is preferably 1.70 or more, and more preferably in the order of 1.73 or more, 1.75 or more, 1.76 or more, 1.77 or more, 1.78 or more, 1.79 or more, and 1.80 or more. An upper limit of the refractive index nd is not particularly limited, but is typically 2.5, and preferably 2.3.

(Glass Composition)

With regard to a composition of the glass according to this embodiment, a non-limiting example will be described below.

The glass according to this embodiment is preferably phosphate glass. The phosphate glass represents glass that mainly contains $P^{5+}$ as a glass network forming component. As the glass network forming component, $P^{5+}$, $B^{3+}$, $Si^{4+}$, $Al^{3+}$, and the like are known. Here, description of "phosphate is mainly contained as the glass network forming component" represents that the content of $P^{5+}$ is larger than the content of any of $B^{3+}$, $Si^{4+}$, and $Al^{3+}$. When the glass is phosphate glass, the degree of coloration in the colored layer can be raised.

In the glass according to this embodiment, a lower limit of the content of $P^{5+}$ is preferably 10%, and more preferably in the order of 13%, 15%, 17%, and 20%. In addition, an upper limit of the content of $P^{5+}$ is preferably 50%, and more preferably in the order of 45%, 40%, 38%, 35%, 33%, and 30%.

$P^{5+}$ is a glass network forming component. On the other hand, when $P^{5+}$ is excessively contained, meltability may deteriorate. Therefore, the content of $P^{5+}$ is preferably within the above range.

In the glass according to this embodiment, an upper limit of the content of $B^{3+}$ is preferably 30%, and more preferably in the order of 25%, 20%, 15%, 13%, and 10%. In addition, a lower limit of the content of $B^{3+}$ is preferably 0.1%, and more preferably in the order of 0.5%, 1%, 3%, and 5%. The content of $B^{3+}$ may be 0%.

$B^{3+}$ is a glass network forming component, and has an operation of improving meltability of the glass. On the other hand, when the content of $B^{3+}$ is excessively large, chemical durability tends to decrease. Therefore, the content of $B^{3+}$ is preferably within the above range.

In the glass according to this embodiment, an upper limit of a cation ratio of the content of $B^{3+}$ to the content of $P^{5+}$ [$B^{3+}/P^{5+}$ ] is preferably 0.70, and more preferably in the order of 0.60, 0.55, and 0.50. The cation ratio [$B^{3+}/P^{5+}$ ] may be 0.

In the glass according to this embodiment, an upper limit of the content of $Si^{4+}$ is preferably 10%, and more preferably in the order of 7%, 5%, 3%, 2%, and 1%. In addition, a lower limit of the content of $Si^{4+}$ is preferably 0.1%, and more preferably in the order of 0.2%, 0.3%, 0.4%, and 0.5%. The content of $Si^{4+}$ may be 0%.

$Si^{4+}$ is a glass network forming component, and has an operation of improving thermal stability, chemical durability, and weather resistance of the glass. On the other hand, when the content of $Si^{4+}$ is excessively large, meltability of the glass may deteriorate, and a glass raw material tends to remain in a partially non-melted state. Therefore, the content of $Si^{4+}$ is preferably within the above range.

In the glass according to this embodiment, an upper limit of the content of $Al^{3+}$ is preferably 10%, and more preferably in the order of 7%, 5%, 3%, and 1%. The content of $Al^{3+}$ may be 0%.

$Al^{3+}$ has an operation of improving chemical durability and weather resistance of the glass. On the other hand, when the content of $Al^{3+}$ is excessively large, thermal stability of the glass may deteriorate, a glass transition temperature Tg may be raised, and meltability is likely to deteriorate. Therefore, the content of $Al^{3+}$ is preferably within the above range.

In the glass according to this embodiment, a lower limit of the total content of $P^{5+}$, $B^{3+}$, $Si^{4+}$, and $Al^{3+}$[$P^{5+}+B^{3+}+Si^{4+}+Al^{3+}$] is preferably 10%, and more preferably in the order of 15%, 18%, 20%, 23%, and 25%. In addition, an upper limit of the total content [$P^{5+}+B^{3+}+Si^{4+}+Al^{3+}$] is preferably 60%, and more preferably in the order of 50%, 45%, 40%, 37%, and 35%.

The glass according to this embodiment preferably contains a transition metal as the glass component, more preferably contains at least one glass component selected from the group consisting of Ti ions, Nb ions, Bi ions, and W ions, and still more preferably the Bi ions.

In the glass according to this embodiment, a lower limit of the content of the Ti ions is preferably 1%, and more preferably in the order of 2% and 3%. In addition, an upper limit of the content of the Ti ions is preferably 45%, and more preferably in the order of 40%, 35%, 30%, 25%, 20%, 15%, and 12%. Here, the Ti ions include all Ti ions different in a valence, including $Ti^{4+}$ and $Ti^{3+}$.

The Ti ions have an operation of greatly contributing to a high refractive index and incrementing coloration of the glass as in the Nb ions, the W ions, and the Bi ions. On the other hand, when the content of the Ti ions is excessively large, meltability of the glass may deteriorate, and a glass raw material tends to remain in a partially non-melted state. Therefore, the content of the Ti ions is preferably within the above range.

In the glass according to this embodiment, a lower limit of the content of the Nb ions is preferably 1%, and more preferably in the order of 5%, 10%, and 15%. In addition, an upper limit of the content of the Nb ions is preferably 45%, and more preferably in the order of 40%, 35%, 30%, 25%, 23%, and 20%. The Nb ions include all Nb ions different in a valence, including $Nb^{5+}$.

The Nb ions are a component that contributes to a high refractive index, and increases coloration of the glass. In addition, the Nb ions have an operation of improving thermal stability and chemical durability of the glass. On the other hand, when the content of the Nb ions is excessively large, the thermal stability of the glass tends to deteriorate. Therefore, the content of the Nb ions is preferably within the above range.

In the glass according to this embodiment, an upper limit of the content of the W ions is preferably 30%, and more preferably in the order of 25%, 20%, 15%, and 13%. In addition, a lower limit of the content of the W ions is preferably 0.5%, and more preferably in the order of 1%, 2%, and 3%. The W ions include all W ions different in a valence, including $W^{6+}$.

The W ions have an operation of contributing to a high refractive index, and increasing coloration of the glass. Accordingly, the content of the W ions is preferably within the above range.

In the glass according to this embodiment, an upper limit of the content of the Bi ions is preferably 40%, and more preferably in the order of 35%, 30%, 28%, and 25%. In addition, a lower limit of the content of the Bi ions is preferably 0.5%, and more preferably in the order of 1%, 2%, and 2.5%. The Bi ions include all Bi ions different in a valence, including $Bi^{3+}$.

The Bi ions have an operation of contributing to a high refractive index, and increasing coloration of the glass. Accordingly, the content of the Bi ions is preferably within the above range.

In the glass according to this embodiment, a lower limit of the total content of the Ti ions, the Nb ions, and the W ions [Ti+Nb+W] is preferably 1%, and more preferably in the order of 5%, 10%, 15%, 20%, and 23%. In addition, an upper limit of the total content [Ti+Nb+W] is preferably 60%, and more preferably in the order of 55%, 50%, 45%, 40%, 38%, and 35%.

In the glass according to this embodiment, an upper limit of the total content of the Ti ions, the Nb ions, the W ions, and the Bi ions [Ti+Nb+W+Bi] is preferably 80%, and more preferably in the order of 75%, 70%, 68%, and 65%. In addition, a lower limit of the total content [Ti+Nb+W+Bi] is preferably 1%, and more preferably in the order of 5%, 10%, 15%, 20%, 23%, and 25%.

In the glass according to this embodiment, a lower limit of a cation ratio of the total content of the Ti ions, the Nb ions, the W ions, and the Bi ions to the total content of $P^{5+}$, $B^{3+}$, and $Si^{4+}$ [$(Ti+Nb+W+Bi)/(P^{5+}+B^{3+}+Si^{4+})$] is preferably 0.1, and more preferably in the order of 0.3, 0.5, 0.6, and 0.7. In addition, an upper limit of the cation ratio [$(Ti+Nb+W+Bi)/(P^{5+}+B^{3+}+Si^{4+})$] is preferably 4.0, and more preferably in the order of 3.5, 3.0, 2.7, and 2.5.

In the glass according to this embodiment, an upper limit of the content of $Ta^{5+}$ is preferably 5%, and more preferably in the order of 3%, 2%, and 1%. The content of $Ta^{5+}$ may be 0%.

$Ta^{5+}$ has an operation of improving thermal stability of the glass. On the other hand, when the content of $Ta^{5+}$ is excessively large, there is a tendency that the glass has a low refractive index and meltability deteriorates. Therefore, the content of $Ta^{5+}$ is preferably within the above range.

In the glass according to this embodiment, an upper limit of the content of $Li^{+}$ is preferably 35%, and more preferably in the order of 30%, 27%, 25%, 23%, and 20%. In addition, a lower limit of the content of $Li^{+}$ is preferably 1%, and more preferably in the order of 2%, 3%, 5%, and 8%. The content of $Li^{+}$ may be 0%.

In the glass according to this embodiment, an upper limit of the content of $Na^{+}$ is preferably 40%, and more preferably in the order of 35%, 30%, 25%, 20%, and 18%. In addition, a lower limit of the content of $Na^+$ is preferably 0.5%, and more preferably in the order of 1%, 1.5%, 3%, and 5%. The content of $Na^+$ may be 0%.

When the glass contains $Li^+$ or $Na^+$, it is easy to carry out chemical reinforcement on the glass. On the other hand, when the content of $Li^+$ or $Na^+$ is excessively large, there is a concern that thermal stability of the glass may deteriorate. Therefore, the content of each of $Li^+$ and $Na^+$ is preferably within the above range.

In the glass according to this embodiment, an upper limit of the total content of $Li^+$ and $Na^+$[$Li^+$+$Na^+$] is preferably 45%, and more preferably in the order of 43%, 40%, and 38%. In addition, a lower limit of the total content [$Li^+$+$Na^+$] is preferably 1%, and more preferably in the order of 5%, 10%, 15%, and 20%.

In the glass according to this embodiment, an upper limit of the content of $K^+$ is preferably 20%, and more preferably in the order of 15%, 13%, 10%, 8%, 5%, and 3%. In addition, a lower limit of the content of $K^+$ is preferably 0.1%, and more preferably in the order of 0.5%, 1.0%, and 1.2%. The content of $K^+$ may be 0%.

$K^+$ has an operation of improving thermal stability of the glass. On the other hand, when the content of $K^+$ is excessively large, the thermal stability tends to deteriorate. Therefore, the content of $K^+$ is preferably within the above range.

In the glass according to this embodiment, an upper limit of the content of $Rb^+$ is preferably 5%, and more preferably in the order of 3%, 1%, and 0.5%. The content of $Rb^+$ may be 0%.

In the glass according to this embodiment, an upper limit of the content of $Cs^+$ is preferably 5%, and more preferably in the order of 3%, 1%, and 0.5%. The content of $Cs^+$ may be 0%.

$Rb^+$ and $Cs^+$ have an operation of improving meltability of the glass. On the other hand, when the content thereof is excessively large, there is a concern that the refractive index nd may be lowered, and volatilization of glass components may increase during melting. Therefore, the content of each of $Rb^+$ and $Cs^+$ is preferably within the above range.

In the glass according to this embodiment, an upper limit of the content of $Mg^{2+}$ is preferably 15%, and more preferably in the order of 10%, 5%, 3%, and 1%. The content of $Mg^{2+}$ may be 0%.

In the glass according to this embodiment, an upper limit of the content of $Ca^{2+}$ is preferably 15%, and more preferably in the order of 10%, 5%, 3%, and 1%. The content of $Ca^{2+}$ may be 0%.

In the glass according to this embodiment, an upper limit of the content of $Sr^{2+}$ is preferably 15%, and more preferably in the order of 10%, 5%, 3%, and 1%. The content of $Sr^{2+}$ may be 0%.

In the glass according to this embodiment, an upper limit of the content of $Ba^{2+}$ is preferably 25%, and more preferably in the order of 20%, 18%, 15%, 10%, and 5%. The content of $Ba^{2+}$ may be 0%.

Any of $Mg^{2+}$, $Ca^{2+}$, $Sr^{2+}$, and $Ba^{2+}$ has an operation of improving thermal stability and meltability of the glass. On the other hand, when the content thereof is excessively large, there is a concern that a high refractive index property may be damaged, and thermal stability of the glass may deteriorate. Therefore, each content of the glass components is preferably within the above range.

In the glass according to this embodiment, an upper limit of the total content of $Mg^{2+}$, $Ca^{2+}$, $Sr^{2+}$, and $Ba^{2+}$ [$Mg^{2+}$+$Ca^{2+}$+$Sr^{2+}$+$Ba^{2+}$ ] is preferably 30%, and more preferably in the order of 25%, 20%, 18%, 15%, 10%, and 5%.

In the glass according to this embodiment, an upper limit of the content of $Zn^{2+}$ is preferably 15%, and more preferably in the order of 10%, 8%, 5%, 3%, and 1%. In addition, a lower limit of the content of $Zn^{2+}$ is preferably 0.1%, and more preferably in the order of 0.3% and 0.5%. The content of $Zn^{2+}$ may be 0%.

$Zn^{2+}$ has an operation of improving thermal stability of the glass. On the other hand, when the content of $Zn^{2+}$ is excessively large, there is a concern that meltability may deteriorate. Therefore, the content of $Zn^{2+}$ is preferably within the above range.

In the glass according to this embodiment, an upper limit of the content of $Zr^{4+}$ is preferably 5%, and more preferably in the order of 3%, 2%, and 1%. The content of $Zr^{4+}$ may be 0%.

$Zr^{4+}$ has an operation of improving thermal stability of the glass. On the other hand, the content of $Zr^{4+}$ is excessively large, thermal stability and meltability of the glass tend to decrease. Therefore, the content of $Zr^{4+}$ is preferably within the above range.

In the glass according to this embodiment, an upper limit of the content of $Ga^{3+}$ is preferably 3%, and more preferably in the order of 2% and 1%. In addition, the lower limit of the content of $Ga^{3+}$ is preferably 0%. The content of $Ga^{3+}$ may be 0%.

In the glass according to this embodiment, an upper limit of the content of $In^{3+}$ is preferably 3%, and more preferably in the order of 2% and 1%. In addition, a lower limit of the content of $In^{3+}$ is preferably 0%. The content of $In^{31}$ may be 0%.

In the glass according to this embodiment, an upper limit of the content of $Sc^{3+}$ is preferably 3%, and more preferably in the order of 2% and 1%. In addition, a lower limit of the content of $Sc^{3+}$ is preferably 0%. The content of $Sc^{3+}$ may be 0%.

In the glass according to this embodiment, an upper limit of the content of $Hf^{4+}$ is preferably 3%, and more preferably in the order of 2% and 1%. In addition, a lower limit of the content of $Hf^{4+}$ is preferably 0%. The content of $Hf^{4+}$ may be 0%.

In the glass according to this embodiment, an upper limit of the content of $Lu^{3+}$ is preferably 3%, and more preferably in the order of 2% and 1%. In addition, a lower limit of the content of $Lu^{3+}$ is preferably 0%. The content of $Lu^{3+}$ may be 0%.

In the glass according to this embodiment, an upper limit of the content of $Ge^{4+}$ is preferably 3%, and more preferably in the order of 2% and 1%. In addition, a lower limit of the content of $Ge^{4+}$ is preferably 0%. The content of $Ge^{4+}$ may be 0%.

In the glass according to this embodiment, an upper limit of the content of $La^{3+}$ is preferably 5%, and more preferably in the order of 4% and 3%. In addition, a lower limit of the content of $La^{3+}$ is preferably 0%. The content of $La^{3+}$ may be 0%.

In the glass according to this embodiment, an upper limit of the content of $Gd^{3+}$is preferably 5%, and more preferably in the order of 4% and 3%. In addition, a lower limit of the content of $Gd^{3+}$ is preferably 0%. The content of $Gd^{3+}$ may be 0%.

In the glass according to this embodiment, an upper limit of the content of $Y^{3+}$ is preferably 5%, and more preferably in the order of 4% and 3%. In addition, a lower limit of the content of $Y^{3+}$ is preferably 0%. The content of $Y^{3+}$ may be 0%.

In the glass according to this embodiment, an upper limit of the content of $Yb^{3+}$ is preferably 3%, and more preferably in the order of 2% and 1%. In addition, a lower limit of the content of $Yb^{3+}$ is preferably 0%. The content of $Yb^{3+}$ may be 0%.

It is preferable that the cation components of the glass according to this embodiment mainly include the above components, that is, $P^{5+}$, $B^{3+}$, $Si^{4+}$, $Al^{3+}$, Ti ions, Nb ions, W ions, Bi ions, $Ta^{5+}$, $Li^{+}$, $Na^{+}$, $K^{+}$, $Rb^{+}$, $Cs^{+}$, $Mg^{2+}$, $Ca^{2+}$, $Sr^{2+}$, $Ba^{2+}$, $Zn^{2+}$, $Zr^{4+}$, $Ga^{3+}$, $In^{3+}$, $Sc^{3+}$, $Hf^{4+}$, $Lu^{3+}$, $Ge^{4+}$, $La^{3+}$, $Gd^{3+}$, $Y^{3+}$, and $Yb^{3+}$, and the total content of the above components is preferably more than 95%, more preferably more than 98%, still more preferably more than 99%, and still more preferably more than 99.5%.

The glass according to this embodiment may contain components other than $F^-$ and $O^{2-}$ as the anion components. Examples of the anion components other than $F^-$ and $O^{2-}$ include $Cl^-$, $Br^-$, and $I^-$. However, any of $Cl^-$, $Br^-$, and $I^-$ is likely to volatile during melting of the glass. Due to volatilization of the components, a problem such as a fluctuation of glass properties, a decrease of homogeneity of the glass, and significant consumption of a melting facility occurs. Therefore, the content of $Cl^-$ is preferably less than 5 anion %, more preferably less than 3 anion %, still more preferably less than 1 anion %, still more preferably less than 0.5 anion %, and still more preferably less than 0.25 anion %. In addition, the total content of Br and $I^-$ is preferably less than 5 anion %, more preferably less than 3 anion %, still more preferably less than 1 anion %, still more preferably less than 0.5 anion %, still more preferably less than 0.1 anion %, and still more preferably 0 anion %.

Note that, the anion % represents a mole percentage when the sum of the contents all anion components is set to 100%.

It is preferable that the glass according to this embodiment is basically composed of the above components, but the glass may contain other components within a range not deteriorating the operation and the effect of the present invention.

For example, the glass according to this embodiment may further contain an appropriate amount of copper (Cu) as the glass component in order to impart near-infrared light absorption properties to the glass. In addition to this, the glass may contain V, Cr, Mn, Fe, Co, Ni, Pr, Nd, Pm, Sm, Eu, Tb, Dy, Ho, Er, Tm, Ce, or the like. These components may increment coloration of the glass, and may become a fluorescence generation source.

In addition, in the present invention, unavoidable impurities may be contained.

<Other Component Compositions>

Any of Pb, As, Cd, Tl, Be, and Se has toxicity. Therefore, it is preferable that the glass of this embodiment does not contain these elements as a glass component.

Any of U, Th, and Ra is a radioactive element. Therefore, it is preferable that the glass of this embodiment does not contain these elements as a glass component.

$Sb^{3+}$, $Sn^{4+}$, and $Ce^{4+}$ are optional glass components which function as a clarifying agent and can be arbitrarily added. Among these, $Sb^{3+}$ is a clarification agent having a high clarifying effect.

The content of $Sb^{3+}$ is expressed as mass % in outer percentage in terms of $Sb_2O_3$. Here, the expression of outer percentage represents that the content of $Sb_2O_3$ is expressed as mass % when content ratios of cation components other than $Sb^{3+}$, $Sn^{4}$, and $Ce^{4+}$ are converted into oxides like $Sb_2O_3$, and a total content ratio of all cation components other than $Sb^{3+}$, $Sn^{4+}$, and $Ce^{4+}$ is set to 100 mass %. The content of $Sb_2O_3$ is preferably less than 2 mass %, more preferably less than 1 mass %, still more preferably less than 0.5 mass %, still more preferably less than 0.2 mass %, still more preferably less than 0.1 mass %, and still more preferably less than 0.05 mass %. When the content of $Sb_2O_3$ is set to the above range, a clarification property of the glass can be improved.

The content of each of $Sn^{4+}$ and $Ce^{4+}$ is also expressed in outer percentage in terms of oxides. That is, when content ratios of cation components other than $Sb^{3+}$, $Sn^{4+}$, and $Ce^{4+}$ are converted into oxides, and a total content ratio of all cation components other than $Sb^{3+}$, $Sn^{4+}$, and $Ce^{4+}$ is set to 100 mass %, the content of $SnO_2$ and the content of $CeO_2$ are expressed as mass %. The content of each of $SnO_2$ and $CeO_2$ is preferably less than 2 mass %, more preferably less than 1 mass %, still more preferably less than 0.5 mass %, and still more preferably less than 0.1 mass %. The content of each of $SnO_2$ and $CeO_2$ may be 0 mass %. When the content of each of $SnO_2$ and $CeO_2$ is set to the above range, the clarification property of the glass can be improved.

(Manufacture of Glass)

The glass according to this embodiment is obtained by preparing non-colored glass, and forming the colored layer having an arbitrary shape in the non-colored glass. The non-colored glass may be prepared by a known glass manufacturing method. For example, a plurality of kinds of compounds are combined and are sufficiently mixed to obtain a batch raw material, and the batch raw material is put into a melting vessel to melt, clarify, and homogenize the batch raw material. Then, molten glass is molded and slowly cooled to obtain glass. Alternatively, the batch raw material is put into the melting vessel and roughly melted. A melted product obtained through the rough melting is quickly cooled and pulverized to prepare a cullet. Moreover, the cullet is put into the melting vessel, and the cullet is heated and remelted to obtain molten glass. The molten glass is molded after clarification and homogenization, and is slowly cooled to obtain the glass. In the molding and slow cooling of the molten glass, a known method is applicable.

Furthermore, a process of raising the amount of moisture in the molten glass may be included in the process of manufacturing the glass according to this embodiment. Examples of the process of raising the amount of moisture in the molten glass include a process of adding a water vapor to a melting atmosphere, and a process of bubbling a gas containing a water vapor in a melted product. In the processes, the process of adding the water vapor to the melting atmosphere is preferably included. When the process of raising the amount of moisture in the molten glass is included, a βOH value of the glass can be raised. When the βOH value is raised, glass having high transparency is obtained.

(Formation of Colored Layer)

In the glass according to this embodiment, the colored layer can be formed by a process of forming a metal film having an arbitrary shape on a glass surface, and a process of performing a heat treatment in a reducing atmosphere.

As a metal that constitutes the metal film, a metal having an operation of storing hydrogen ions in an atmosphere, and reducing a glass component contained in the glass by giving and receiving hydrogen ions and electrons is preferable. A metal having an operation of reducing a transition metal among the glass components is more preferable. Specific examples of the metal include Ni, Au, Ag, Pt, Pd, and alloys such as a Pt—Pd alloy containing these metals.

When forming the colored layer, a metal paste containing a metal that constitutes the above metal film may be used. In addition, a method of forming the metal film on the glass surface is not particularly limited as long as the metal film can be brought into close contact with the glass surface, and examples thereof include deposition, sputtering, plating, screen printing, application, and the like.

The reducing atmosphere may contain a gas having reducing power. Examples of the gas having reducing power include hydrogen. Accordingly, a hydrogen-containing gas is preferably used as the reducing atmosphere, and a hydrogen-containing forming gas may be used. The forming gas is a mixed gas composed of hydrogen and nitrogen, and typically contains approximately 3 to 5 volume % of hydrogen.

In the heat treatment, heating is performed at a temperature equal to or higher than a temperature lower than a glass transition temperature (Tg) by 200° C. (Tg-200), and is equal to or lower than a softening point temperature. A heat treatment time can be appropriately adjusted depending on the degree of coloration, a range of the colored layer, and the thickness of the colored layer which are desired, and the like.

After the heat treatment, the metal film is peeled off from the glass surface. A peeling-off method is not particularly limited, but examples thereof include a removal method through polishing or dissolution in an acidic solution.

Due to the heat treatment in the reducing atmosphere, the colored layer is formed from the glass surface with which the metal film comes into contact to an inner side of the glass.

A mechanism in which the colored layer is formed by the above-described method is not particularly limited, but the mechanism is considered as follows.

Coloration of the colored layer formed in this embodiment is considered as a reduction color caused by the glass component, and particularly, a reduction color caused by the transition metal. Typically, even when a glass molded body is subjected to a heat treatment in an atmosphere containing hydrogen in a low concentration of approximately 3 to 5 volume %, the glass hardly exhibits the reduction color. However, since the metal film stores hydrogen ions in the atmosphere, a glass portion that is in contact with the metal film is supplied with a large amount of hydrogen ions in comparison to a portion that is not in contact with the metal film, and as a result, a reducing reaction proceeds fast. Accordingly, the glass portion that is in contact with the metal film is darkly colored. The amount of hydrogen ions stored due to the metal film is large, and the concentration of hydrogen in the atmosphere may decrease due to storage by the metal film. A such, the reducing reaction is less likely to proceed in the glass portion that is not in contact with the metal film.

Here, the reducing reaction of the glass component which causes coloration proceeds in all directions from a portion that is in contact with the metal film. That is, when being observed from a cross-section of the glass, the colored layer is formed from the glass surface that is in contact with the metal film in a thickness direction, and when being observed from the glass surface, the colored layer is formed radially from a portion that is in contact with the metal film.

According to the method, it is possible to form the colored layer that is more darkly colored. Accordingly, even when the thickness of the colored layer is small, a transmittance can be sufficiently reduced. In a case where the thickness of the colored layer is small, a range of the colored layer formed radially from the portion that is in contact with the metal film when being observed from the glass surface decreases. That is, according to this embodiment, when adjusting formation conditions of the colored layer, the colored layer having approximately the same shape as in the metal film can be formed when being observed from the glass surface.

(Manufacture of Optical Element or the Like)

An optical element including the glass according to this embodiment is obtained by preparing a non-colored optical element and forming the colored layer having an arbitrary shape in the non-colored optical element. The non-colored optical element may be prepared in accordance with a known manufacturing method. For example, molten glass is cast into a mold, and is molded in a plate shape, thereby preparing a glass raw material. The obtained glass material is appropriately cut, grinded, and polished to prepare a cut piece having a size and a shape suitable for press molding. The cut piece is heated, softened, and press molded (reheat pressed) by a known method, thereby preparing an optical element blank that approximates a shape of the optical element. The optical element blank is annealed, and is grinded and polished by a known method, thereby preparing the optical element.

The colored layer can be formed in the prepared optical element by the above method. The colored layer may also be formed during the manufacturing process of the optical element.

An optical functional surface of the prepared optical element may be coated with an antireflection film, a total reflection film, or the like in correspondence with the purpose of use.

According to an aspect of the present invention, an optical element including the above glass can be provided. Examples of the kind of the optical element include lenses such as a spherical lens and aspherical lens, prisms, and the like. Examples of the shape of the lenses include various shapes such as a biconvex lens, a plano-convex lens, a biconcave lens, a plano-concave lens, a convex meniscus lens, and a concave meniscus lens. The optical element can be manufactured by a method including a process of processing a glass molded body formed from the glass. Examples of the processing include severing, cutting, rough grinding, fine grinding, polishing, and the like.

In addition, as an example of the optical element, an optical element that shields light obliquely incident to a light-receiving surface of an image sensor such as CCD and CMOS can be exemplified. Specific examples of the optical element include a cover glass that shields light obliquely incident on the light-receiving surface of the image sensor.

In addition, according to the aspect of the present invention, the glass can be used as decorations, exteriors of small electronic devices, and the like by taking advantage of a decorative property of the colored layer.

EXAMPLES

Hereinafter, the present invention will be described in more detail with reference to examples, but the present invention is not limited to the following examples.

Glass samples having a glass composition shown in Table 1 were prepared in the following procedure, and various kinds of evaluation were performed.

TABLE 1

| | No. | No. 1 | No. 2 | No. 3 | No. 4 | No. 5 |
|---|---|---|---|---|---|---|
| Cation % | $Si^{4+}$ | 0.0 | 0.0 | 0.0 | 0.0 | 0.0 |
| | $B^{3+}$ | 2.9 | 0.0 | 6.5 | 6.5 | 6.5 |
| | $P^{5+}$ | 28.0 | 27.2 | 26.3 | 25.7 | 26.5 |
| | $Li^{+}$ | 8.5 | 0.0 | 19.7 | 20.3 | 20.9 |
| | $Al^{3+}$ | 0.0 | 0.0 | 0.0 | 0.0 | 0.0 |
| | $Na^{+}$ | 8.0 | 1.9 | 16.4 | 16.0 | 16.5 |
| | $K^{+}$ | 1.9 | 1.4 | 2.3 | 2.3 | 2.3 |
| | $Mg^{2+}$ | 0.0 | 0.0 | 0.0 | 0.0 | 0.0 |
| | $Ca^{2+}$ | 0.0 | 0.0 | 0.0 | 0.0 | 0.0 |
| | $Sr^{2+}$ | 0.0 | 0.0 | 0.0 | 0.0 | 0.0 |
| | $Ba^{2+}$ | 0.8 | 4.0 | 0.5 | 0.5 | 0.5 |
| | $Zn^{2+}$ | 0.0 | 0.0 | 0.9 | 0.9 | 0.9 |
| | Ti ions | 4.0 | 10.4 | 3.0 | 0.0 | 0.0 |
| | Nb ions | 19.5 | 19.4 | 19.0 | 24.6 | 22.6 |
| | W ions | 4.0 | 11.0 | 2.7 | 0.0 | 0.0 |
| | Bi ions | 22.4 | 24.7 | 2.7 | 3.2 | 3.3 |
| | $Ta^{5+}$ | 0.0 | 0.0 | 0.0 | 0.0 | 0.0 |
| | $Zr^{4+}$ | 0.0 | 0.0 | 0.0 | 0.0 | 0.0 |
| | $La^{3+}$ | 0.0 | 0.0 | 0.0 | 0.0 | 0.0 |
| | $Gd^{3+}$ | 0.0 | 0.0 | 0.0 | 0.0 | 0.0 |
| | $Y^{3+}$ | 0.0 | 0.0 | 0.0 | 0.0 | 0.0 |
| | $Yb^{3+}$ | 0.0 | 0.0 | 0.0 | 0.0 | 0.0 |
| | Sum | 100 | 100 | 100 | 100 | 100 |
| Mass % (outer percentage) | $Sb_2O_3$ | 0.1 | 0.02 | 0.01 | 0.01 | 0.01 |
| Properties | Refractive index nd | 2.00 | 2.10 | 1.82 | 1.82 | 1.8 |
| | Specific gravity ($g/cm^3$) | 5.1 | 5.6 | 3.7 | 3.6 | 3.6 |
| | Tg (° C.) | 479 | 561 | 454 | 456 | 454 |

[Production of Glass]

Oxides, hydroxides, metaphosphates, carbonates, and nitrates corresponding to the constituent components of the glass were prepared as raw materials, the raw materials were weighed and combined so that a composition of obtained glass becomes each composition shown in Table 1, and the raw materials were sufficiently mixed. The obtained combination raw material (batch raw material) was put into a platinum crucible, and was heated at 1100° C. to 1450° C. for two to three hours to obtain molten glass. The molten glass was stirred to be homogenized. After being clarified, the molten glass was cast into a mold that was preheated at an appropriate temperature. The cast glass was subjected to a heat treatment near a glass transition temperature Tg for approximately one hour, and was cooled to room temperature within a furnace. The glass was processed into a size of 40 mm (vertical), 60 mm (horizontal), and 15 mm (thickness), and two surfaces having dimensions of 40 mm×60 mm were precisely polished (optically polished) to obtain a glass sample.

[Confirmation of Glass Component Composition]

With respect to the obtained glass sample, the contents of respective glass components were measured by inductively coupled plasma atomic emission spectrometry (ICP-AES), and it was confirmed that the contents satisfy respective compositions shown in Table 1.

[Measurement of Optical Properties]

With respect to the obtained glass samples, a refractive index nd, a specific gravity, and a glass transition temperature Tg were measured. Results are shown in Table 1.

(i) Refractive Index nd

Refractive index nd was measured by a refractive index measuring method conforming to JIS standard JIS B 7071-1.

(ii) Specific Gravity

The specific gravity was measured by an Archimedes method.

(iii) Glass Transition Temperature Tg

The glass transition temperature Tg was measured at a temperature rising rate of 4° C./minute by using a thermo-mechanical analyzer (TMA4000S) manufactured by MAC Science Co. Ltd.

Example 1-1

Among the obtained glass samples, a glass sample having a glass composition of No. 1 was processed into a size of 20 mm (vertical), 20 mm (horizontal), and 1.0 mm (thickness), and two surfaces having a size of 20 mm×20 mm were precisely polished (optical polished). A metal film (Pt—Pd film) having an arbitrary shape was formed on one surface of the optically polished surfaces by sputtering (current during sputtering: 15 mA, and film formation time: 900 sec).

The glass sample on which the metal film was formed was subjected to a heat treatment at 400° C. for five hours while feeding a forming gas (hydrogen: 3 volume %, nitrogen: 97 volume %) as a reducing atmosphere at a flow rate of 0.2 L/min.

The metal film was peeled off by polishing. A glass sample including a colored layer having approximately the same shape as that of the formed metal film in a plan view was obtained.

[Measurement of Transmittance]

An external transmittance at a wavelength of 300 to 2500 nm was measured. The external transmittance is defined as a percentage of transmitted light intensity to incident light intensity [transmitted light intensity/incident light intensity×100] when light is incident in a thickness direction of the glass sample. Note that, a reflection loss of light beams on a sample surface is also included in the external transmittance. Results are shown in FIG. 7. In the drawing, a dotted line represents a transmittance of a portion provided with the colored layer, and a solid line represents a transmittance of the same portion before forming the colored layer (before the heat treatment in the reducing atmosphere).

[Measurement of OD]

Incident light intensity $I_0$ and transmitted light intensity I at a wavelength of 1100 nm were measured with respect to a portion provided with the colored layer, and an optical density (OD) was calculated by the following Expression. The OD before formation of the colored layer (before the heat treatment in the reducing atmosphere) was also calculated with respect to the same portion. Results are shown in Table 2.

$$OD=-\log_{10}(I/I_0)$$

[Measurement of λ70]

A sample before formation of the colored layer (before the heat treatment in the reducing atmosphere) was processed to have a thickness of 10 mm and to have parallel and optically polished planar surfaces, and a spectral transmittance was measured. An intensity of light beams vertically incident to one of the optically polished planar surfaces was set to an intensity A, and an intensity of light beams emitted from the other planar surface was set to an intensity B, thereby calculating a spectral transmittance B/A. A wavelength at which the spectral transmittance becomes 70% was set as λ70. Note that, a reflection loss of light beams on a sample surface is also included in the spectral transmittance. Results are shown in Table 3.

Example 1-2

A glass sample including a colored layer was obtained in a similar manner as in Example 1-1 except that a glass sample having a glass composition of No. 2 was used.

The transmittance was measured in a similar manner as in Example 1-1. Results are shown in FIG. 8.

The OD was measured in a similar manner as in Example 1-1. Results are shown in Table 2.

λ70 was measured in a similar manner as in Example 1-1. Results are shown in Table 3.

Example 1-3

A glass sample including a colored layer was obtained in a similar manner as in Example 1-1 except that a glass sample having a glass composition of No. 3 was used and a heat treatment was performed at 430° C. for 9 hours.

The transmittance was measured in a similar manner as in Example 1-1. Results are shown in FIG. 9.

The OD was measured in a similar manner as in Example 1-1. Results are shown in Table 2.

λ70 was measured in a similar manner as in Example 1-1. Results are shown in Table 3.

Example 1-4

A glass sample including a colored layer was obtained in a similar manner as in Example 1-1 except that a glass sample having a glass composition of No. 4 was used, the glass sample was processed to have a thickness of 0.4 mm, and a heat treatment was performed at 410° C. for 5 hours.

The transmittance was measured in a similar manner as in Example 1-1. In addition, a transmittance of a non-colored portion (portion where the colored layer is not formed) after the heat treatment in the reducing atmosphere was also measured. Results are shown in FIG. 10. In the drawing, a broken line represents the transmittance of the non-colored portion after the heat treatment in the reducing atmosphere.

The OD was measured in a similar manner as in Example 1-1. In addition, the OD of the non-colored portion (portion where the colored layer is not formed) after the heat treatment in the reducing atmosphere was also measured. Results are shown in Table 2.

λ70 was measured in a similar manner as in Example 1-1. In addition, λ70 of the non-colored portion (portion where the colored layer is not formed) after the heat treatment in the reducing atmosphere was also measured. Results are shown in Table 3.

Example 1-5

A glass sample including a colored layer was obtained in a similar manner as in Example 1-1 except that a glass sample having a glass composition of No. 5 was used, a heat treatment was performed at 440° C. for 12 hours.

The transmittance was measured in a similar manner as in Example 1-1. In addition, a transmittance of the non-colored portion (portion where the colored layer is not formed) after the heat treatment in the reducing atmosphere was also measured. Results are shown in FIG. 11. In the drawing, a broken line represents the transmittance of the non-colored portion (portion where the colored layer is not formed) after the heat treatment in the reducing atmosphere.

The OD was measured in a similar manner as in Example 1-1. In addition, the OD of the non-colored portion (portion where the colored layer is not formed) after the heat treatment in the reducing atmosphere was also measured. Results are shown in Table 2.

λ70 was measured in a similar manner as in Example 1-1. In addition, λ70 of the non-colored portion (portion where the colored layer is not formed) after the heat treatment in the reducing atmosphere was also measured. Results are shown in Table 3.

Example 1-6

A glass sample including a colored layer was obtained in a similar manner as in Example 1-1 except that a glass sample having a glass composition of No. 3 was used, a Ni film was formed as the metal film, and a heat treatment was performed at 430° C. for 9 hours The transmittance was measured in a similar manner as in Example 1-1. In addition, a transmittance of the non-colored portion (portion where the colored layer is not formed) after the heat treatment in the reducing atmosphere was also measured. Results are shown in FIG. 12. In the drawing, a broken line represents the transmittance of the non-colored portion (portion where the colored layer is not formed) after the heat treatment in the reducing atmosphere.

The OD was measured in a similar manner as in Example 1-1. In addition, the OD of the non-colored portion (portion where the colored layer is not formed) after the heat treatment in the reducing atmosphere was also measured. Results are shown in Table 2.

λ70 was measured in a similar manner as in Example 1-1. In addition, λ70 of the non-colored portion (portion where the colored layer is not formed) after the heat treatment in the reducing atmosphere was also measured. Results are shown in Table 3.

TABLE 2

| Example | Glass Sample No. | Metal film | OD (λ = 1100 nm) Before heat treatment | After heat treatment Colored layer | Non-colored portion |
|---|---|---|---|---|---|
| 1-1 | No. 1 | Pt—Pd | 0.1 | 4.0 | — |
| 1-2 | No. 2 | Pt—Pd | 0.1 | 0.9 | — |
| 1-3 | No. 3 | Pt—Pd | 0.1 | 2.1 | — |
| 1-4 | No. 4 | Pt—Pd | 0.1 | 0.9 | 0.1 |
| 1-5 | No. 5 | Pt—Pd | 0.1 | 1.3 | 0.1 |
| 1-6 | No. 3 | Ni | 0.1 | 1.6 | 0.1 |

TABLE 3

| Example | Glass Sample No. | Metal film | λ70 (nm) Before heat treatment | After heat treatment Non-colored portion |
|---|---|---|---|---|
| 1-1 | No. 1 | Pt—Pd | 417 | — |
| 1-2 | No. 2 | Pt—Pd | 474 | — |
| 1-3 | No. 3 | Pt—Pd | 389 | — |
| 1-4 | No. 4 | Pt—Pd | 366 | 373 |
| 1-5 | No. 5 | Pt—Pd | 364 | 394 |
| 1-6 | No. 3 | Ni | 383 | 398 |

Example 2-1

The glass sample having the composition of No. 3 in Table 1 was processed into a circular shape having a diameter of 30 mm and a thickness of 2.0 mm, and two main surfaces were precisely polished (optically polished). A metal film (Ni film) patterned into an arbitrary shape was formed on one of the optically polished surfaces (main surfaces) by using a metal paste. In addition, a metal film (Ni film) was formed on the entirety of a side surface of the same sample.

The sample on which the metal films were formed was subjected to a heat treatment at 430° C. for 9 hours while feeding a forming gas (hydrogen: 3 volume % and nitrogen: 97 volume %) as a reducing atmosphere at a flow rate of 0.2 L/min.

The metal film was removed. A sample including a colored layer on the main surface and the side surface as illustrated in FIG. 2 was obtained.

Example 2-2

The glass sample having the composition of No. 3 in Table 1 was processed into a square shape having dimensions of 50 mm (vertical)×50 mm (horizontal)×1.0 mm (thickness), and two surfaces having dimensions of 50 mm×50 mm were precisely polished (optically polished). A metal film (Pt—Pd film) patterned into an arbitrary shape was formed on one (first main surface) of the optically polished surfaces by using a metal paste. In addition, a metal film (Pt—Pd film) was formed on the other optically polished surface (second main surface) of the same sample so as not to overlap the metal film formed on the first main surface in a plan view.

The sample on which the metal films were formed was subjected to a heat treatment at 430° C. for 9 hours while feeding a forming gas (hydrogen: 3 volume % and nitrogen: 97 volume %) as a reducing atmosphere at a flow rate of 0.2 L/min.

The metal films were removed. A sample including a colored layer on the first main surface and the second main surface as illustrated in FIG. 3 was obtained. It was confirmed that the obtained sample can be preferably used as a cover glass of a CCD or a CMOS sensor (solid-state imaging element) as disclosed in Patent Document 2.

Example 2-3

The glass sample having the composition of No. 3 in Table 1 was processed into a square shape having dimensions of 50 mm (vertical)×50 mm (horizontal)×1.0 mm (thickness), and two surfaces having dimensions of 50 mm×50 mm were precisely polished (optically polished). A metal film (Pt—Pd film) patterned into an arbitrary shape was formed on one (first main surface) of the optically polished surfaces by using a metal paste. In addition, a metal film (Pt—Pd film) was formed on the other optically polished surface (second main surface) of the same sample in the same shape and at the same position as in the metal film formed on the first main surface in a plan view. Then, a heat treatment was performed in a reducing atmosphere in a similar manner as in Example 2-2 except that the heat treatment time was set to 4.5 hours.

The metal films were removed. A sample including a colored layer on both surfaces as illustrated in FIG. 4 was obtained. It is confirmed that the obtained sample can also be preferably used as a cover glass of the image sensor as in the sample in Example 2-2.

The invention claimed is:

1. A cover glass comprising a glass containing:

one or more glass components selected from the group consisting of Ti ions, Nb ions, W ions, and Bi ions, wherein the glass includes a colored layer having an arbitrary shape, the cover glass comprising:

a light-shielding portion and a light-transmitting portion, wherein the light-shielding portion and the light-transmitting portion have the same glass composition, and the light-shielding portion comprises the colored layer, and wherein the glass has a plate shape, the colored layer is provided on a first main surface and a second main surface, and the colored layer of the first main surface does not overlap the colored layer of the second main surface in a plan view.

2. The cover glass according to claim 1, wherein the glass is phosphate glass, a content of $P^{5+}$ is 10 to 50 cation %, and a total content of Ti ions, Nb ions, W ions, and Bi ions [Ti+Nb+W+Bi] is 1 to 80 cation %.

3. The cover glass according to claim 1, wherein a cation ratio of a content of $B^{3+}$ to a content of $P^{5+}$ [$B^{3+}/P^{5+}$] is 0.70 or less, a cation ratio of a total content of Ti ions, Nb ions, W ions, and Bi ions to a total content of $P^{5+}$, $B^{3+}$, and $Si^{4+}$ [(Ti+Nb+W+Bi)/($P^{5+}$+$B^{3+}$+$Si^{4+}$)] is 0.1 to 0.4, a total content of Ti ions, Nb ions, and W ions [Ti+Nb+W] is 1 to 60 cation %, and a refractive index nd is 1.70 or more.

4. The cover glass according to claim 1, wherein a content of Ti ions is 1 to 45 cation %, a content of Nb ions is 1 to 45 cation %, a content of W ions is 30 cation % or less, and a content of Bi ions is 40 cation % or less.

5. The cover glass according to claim 1, wherein a content of Bi ions is 0.5 to 40 cation %.

6. The cover glass according to claim 1, wherein a total content of $Li^+$ and $Na^+$ [$Li^+$+$Na^+$] is 1 to 45 cation %, a content of $K^+$ is 20 cation % or less, and a total content of $Mg^{2+}$, $Ca^{2+}$, $Sr^{2+}$, and $Ba^{2+}$ [$Mg^{2+}$+$Ca^{2+}$+$Sr^{2+}$+$Ba^{2+}$] is 30 cation % or less.

7. The cover glass according to claim 1, wherein an optical density OD of the colored layer in a wavelength region from a visible region to an infrared region tends to decrease as the wavelength becomes longer, and the optical density OD of a portion provided with the colored layer at a wavelength of 1100 nm is 0.3 or more.

8. The cover glass according to claim 1, wherein the glass comprises a non-colored portion, and a transmittance of the non-colored portion at a thickness of 1 mm is 50% or more with respect to light beams having a wavelength of 400 to 800 nm.

* * * * *